US012232525B2

(12) United States Patent
Yi

(10) Patent No.: US 12,232,525 B2
(45) Date of Patent: Feb. 25, 2025

(54) ATOMIZER FOR ELECTRONIC CIGARETTE AND ELECTRONIC CIGARETTE

(71) Applicant: Changhao Yi, Shenzhen (CN)

(72) Inventor: Changhao Yi, Shenzhen (CN)

( * ) Notice: Subject to any disclaimer, the term of this patent is extended or adjusted under 35 U.S.C. 154(b) by 378 days.

(21) Appl. No.: 17/777,998

(22) PCT Filed: Feb. 28, 2020

(86) PCT No.: PCT/CN2020/077205
§ 371 (c)(1),
(2) Date: May 18, 2022

(87) PCT Pub. No.: WO2021/120396
PCT Pub. Date: Jun. 24, 2021

(65) Prior Publication Data

US 2022/0346445 A1 Nov. 3, 2022

(30) Foreign Application Priority Data

Dec. 18, 2019 (CN) ........................ 201922283489.9

(51) Int. Cl.
*A24F 40/42* (2020.01)
*A24F 7/02* (2006.01)
(Continued)

(52) U.S. Cl.
CPC ................ *A24F 40/42* (2020.01); *A24F 7/02* (2013.01); *A24F 40/10* (2020.01); *A24F 40/44* (2020.01);
(Continued)

(58) Field of Classification Search
CPC ........ A24F 40/42; A24F 40/485; A24F 40/10; A24F 40/46; A24F 40/44; A24F 7/02; H05B 3/06; H05B 2203/021
(Continued)

(56) References Cited

U.S. PATENT DOCUMENTS 8,707,965 B2 * 4/2014 Newton ................ A24F 40/485
131/194
9,078,475 B2 * 7/2015 Li ........................ A61M 11/042
(Continued)

FOREIGN PATENT DOCUMENTS

CN 103504478 A 1/2014
CN 203913391 U 11/2014
(Continued)

*Primary Examiner* — Gary F Paumen
(74) *Attorney, Agent, or Firm* — Cheng-Ju Chiang

(57) ABSTRACT

The invention relates to an atomizer for an electronic cigarette and an electronic cigarette with a new connection structure scheme. The solution adopted in the present invention is: an atomizer for an electronic cigarette, comprising an oil storage pipe, a ventilation pipe, an atomization assembly and an electrical connection seat. The ventilation pipe is arranged in the oil storage pipe. The atomizer comprises a limiting stepped column and a protrusion protruding from an outer side surface of the ventilation pipe. The stepped column and the protrusion are arranged at one end of the ventilation pipe and define a groove at the outer side surface of the ventilation pipe. One end of the oil storage pipe is radially provided with a flange and one end of the electrical connection seat is radially provided with an edgefold. The flange and the edgefold are sleeved and fixed in the groove.

15 Claims, 7 Drawing Sheets

(51) Int. Cl.

| | |
|---|---|
| ***A24F 40/10*** | (2020.01) |
| ***A24F 40/44*** | (2020.01) |
| ***A24F 40/46*** | (2020.01) |
| ***A24F 40/485*** | (2020.01) |
| ***H05B 3/06*** | (2006.01) |

(52) U.S. Cl.

CPC ............ *A24F 40/46* (2020.01); *A24F 40/485* (2020.01); *H05B 3/06* (2013.01); *H05B 2203/021* (2013.01)

(58) Field of Classification Search

USPC ........................................................... 131/329

See application file for complete search history.

(56) References Cited

U.S. PATENT DOCUMENTS

| | | | | |
|---|---|---|---|---|
| 9,596,887 | B2 * | 3/2017 | Newton | A24F 40/44 |
| 10,045,563 | B2 * | 8/2018 | Li | H01R 13/502 |
| 10,098,385 | B1 | 10/2018 | Schwartz | |
| 2013/0228191 | A1 | 9/2013 | Newton | |

FOREIGN PATENT DOCUMENTS

| | | | |
|---|---|---|---|
| CN | 204722254 | U | 10/2015 |
| CN | 106490692 | A | 3/2017 |
| CN | 107072322 | A | 8/2017 |

* cited by examiner

ATOMIZER FOR ELECTRONIC CIGARETTE AND ELECTRONIC CIGARETTE

CROSS REFERENCE TO RELATED APPLICATIONS

The present invention is a 35 U.S.C. § 371 National Phase conversion of International (PCT) Patent Application No. PCT/CN2020/077205, filed on Feb. 28, 2020, which claims benefit of Chinese Application No. 201922283489.9, filed on Dec. 18, 2019, the disclosure of which is incorporated by reference herein. The PCT International Patent Application was filed and published in Chinese.

FIELD OF THE INVENTION

The present invention relates to traditional cigarette substitute product technical field, particularly to an atomizer for an electronic cigarette and an electronic cigarette.

BACKGROUND OF THE INVENTION

In recent years, as a substitute for cigarettes, electronic cigarettes are accepted and loved by more and more smokers because they are easy to use, and they are safe and healthy. Electronic cigarettes have the same shape of ordinary cigarettes and are usually composed of atomizers and battery components. When electronic cigarettes are in use, smoke can be directly sucked out, and when they are not in use, they can be directly stored and put into a pocket or a backpack.

In an electronic cigarette, solution (smoke oil) with tobacco fragrance is injected into an oil storage chamber, and the oil storage chamber and an atomization chamber are communicated through an oil inlet channel. An atomization assembly is arranged in the atomization chamber, and an oil absorber in the atomization assembly is used to absorb the electronic cigarette liquid (i.e., e-liquid) flowing in from the oil inlet channel and heat the oil absorber through a heating wire, so that the e-liquid absorbed by the oil absorber is atomized into smoke. The smoker sucks smoke-like e-liquid out of an air channel and exhales smoke, just like smoking a real cigarette. In the prior art, the connection between an oil storage pipe, a ventilation pipe and an electrical connection seat is usually achieved by glue, but the quality of the finished product obtained by glue is not easy to control.

SUMMARY OF THE INVENTION

The present invention is directed to the problems existing in the prior art, and provides an atomizer for an electronic cigarette and an electronic cigarette of a new connection structure scheme.

To achieve the above objects of the invention, the present invention adopts the following technical solutions.

The technical solution provides an atomizer for an electronic cigarette. The atomizer includes an oil storage pipe, a ventilation pipe, an atomization assembly and an electrical connection seat for connecting an external power supply. At least one part of the ventilation pipe is arranged in the oil storage pipe. The ventilation pipe and the oil storage pipe together form an oil storage cavity. The ventilation pipe is provided with an oil inlet hole that communicates with the oil storage cavity. At least one part of the atomization assembly is arranged in the ventilation pipe to absorb the fuming material from the oil inlet hole. The electrical connection seat is provided with a conductive electrode, and the heating element in the atomization assembly is electrically connected to the conductive electrode. The atomizer comprises a limiting stepped column protruding from an outer side surface of the ventilation pipe and a protrusion protruding from the outer side surface of the ventilation pipe. The stepped column and the protrusion are arranged at one end of the ventilation pipe and define a groove at the outer side surface of the ventilation pipe. One end of the oil storage pipe is radially provided with a flange, and one end of the electrical connection seat is radially provided with an edgefold. At least one part of the flange and at least one part of the edgefold are sleeved and fixed in the groove. The connection between the oil storage pipe and the ventilation pipe is airtight coupling.

Preferably, the ventilation pipe is also sleeved with a first sealing ring, and the first sealing ring is located in the groove and compresses the stepped column and the flange, the edgefold abuts the flange and protrusion.

Preferably, sealant is also provided between the stepped column and the flange, and the sealant is used to seal the connection gap between the stepped column and the flange; the edgefold abuts the flange and the protrusion.

Preferably, the stepped column is located in the oil storage cavity, the flange abuts the stepped column after passing the protrusion, and the edgefold goes through the protrusion by elastic deformation and then abuts against the protrusion.

Preferably, the edgefold is composed of a plurality of elastic bodies to form a claw-like structure; the inner diameter defined by the edgefold is less than the outer diameter of the protrusion or the groove; the surface of the protrusion contacting the edgefold is substantially perpendicular to the side surface of the ventilation pipe, the surface of the edgefold contacting the protrusion is substantially perpendicular to the side surface of the ventilation pipe.

Preferably, during the assembly process, the surface that the protrusion and the edgefold contact first is an inclined surface or an arc transitional surface.

Preferably, the atomizer further comprises a suction nozzle, the oil storage cavity enclosed by the ventilation pipe and the oil storage pipe has an opening, the suction nozzle connects to the ventilation pipe or/and the oil storage pipe and then seals the opening.

Preferably, the suction nozzle is connected to the ventilation pipe through a clamping structure, after the suction nozzle is connected to the ventilation pipe, the suction nozzle abuts against the oil storage pipe to seal the opening.

Preferably, the atomizer further comprises a second sealing ring and a third sealing ring, the second sealing ring is located between the suction nozzle and the ventilation pipe, the second sealing ring tightly presses the suction nozzle and the ventilation pipe; the third sealing ring tightly presses the suction nozzle and the oil storage pipe.

Preferably, the atomization assembly has two ends, both ends of the atomization assembly are sleeved with elastic sealing sleeves, the part of the middle side surface of the atomization assembly that is not covered by the sealing sleeve is close to the oil inlet hole so as to absorb the e-liquid flowing in from the oil inlet hole; after the atomization assembly is installed in the ventilation pipe, both the sealing sleeves abut against the inner wall of the ventilation pipe.

Preferably, each of the sealing sleeves is provided with at least one convex ring surrounding the sealing sleeves on the surface contacting the ventilation pipe.

Preferably, the outer diameter of the portion of an oil absorber covered by the sealing sleeve is less than the outer diameter of the portion of the oil absorber that is not covered by the sealing sleeve.

Preferably, the outer diameter of the part of the oil absorber by the oil inlet hole is close to the size of the inner diameter of the space in which the atomization assembly is arranged in the ventilation pipe.

Preferably, the electrical connection seat comprises a plastic socket, a first electrode and a second electrode, and the edgefold is integrally formed on the socket, the first electrode is fixed on the socket and is located at one end away from the edgefold, and the first electrode and the second electrode are connected by an insulator sleeved between.

This technical scheme also provides an electronic cigarette comprising an atomizer and a power supply. The power supply is used to supply power for the atomizer. The atomizer is the electronic cigarette atomizer described in any of the above technical solutions.

Compared with existing atomizers and electronic cigarettes, because the limiting stepped column and the protrusion protrude from the outer side surface of the ventilation pipe, the oil storage pipe and the electrical connection seat pass the flange and the edgefold and sleeve on the outer side surface of the ventilation pipe and are fixed in the groove, the limit fixing solution of sleeving and clamping connection of this technique solution is simple in assembly, low in manufacturing and assembly cost, and convenient for quality control of finished products.

BRIEF DESCRIPTION OF THE DRAWINGS

To better illustrate the technique solution in the preferred embodiments of the present invention, below is a brief introduction of drawings used in embodiment description. Obviously, the drawings in the following description are only some embodiments of the present invention. On account of these drawing, those of ordinary skill in the art can also obtain, without creative work, other drawings.

DETAILED DESCRIPTION OF THE INVENTION

To better illustrate the technical problem, technical solutions and advantages of the present disclosure, embodiments will now be described in detail below with references to the drawings. It is to be understood that the preferred embodiments described in this part are only to be considered as illustrating the present disclosure instead of limiting the scope of the present disclosure.

The First Embodiment

Figure 1:
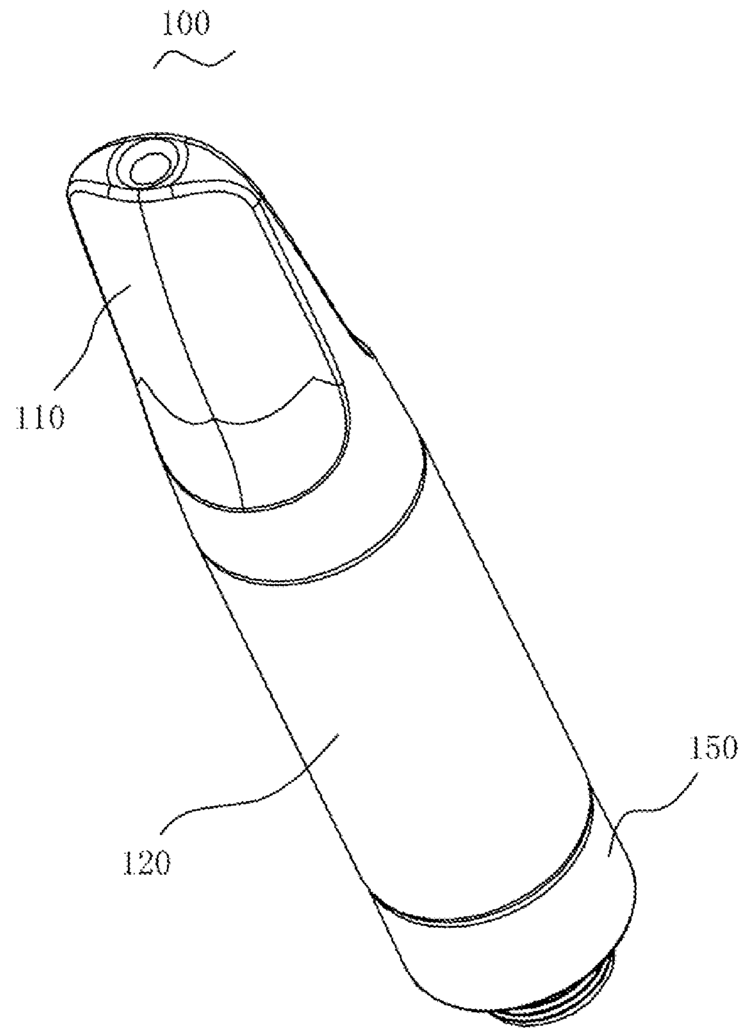
FIG. 1 is a perspective view of the atomizer according to the first embodiment provided in the present invention.
Figure 2:
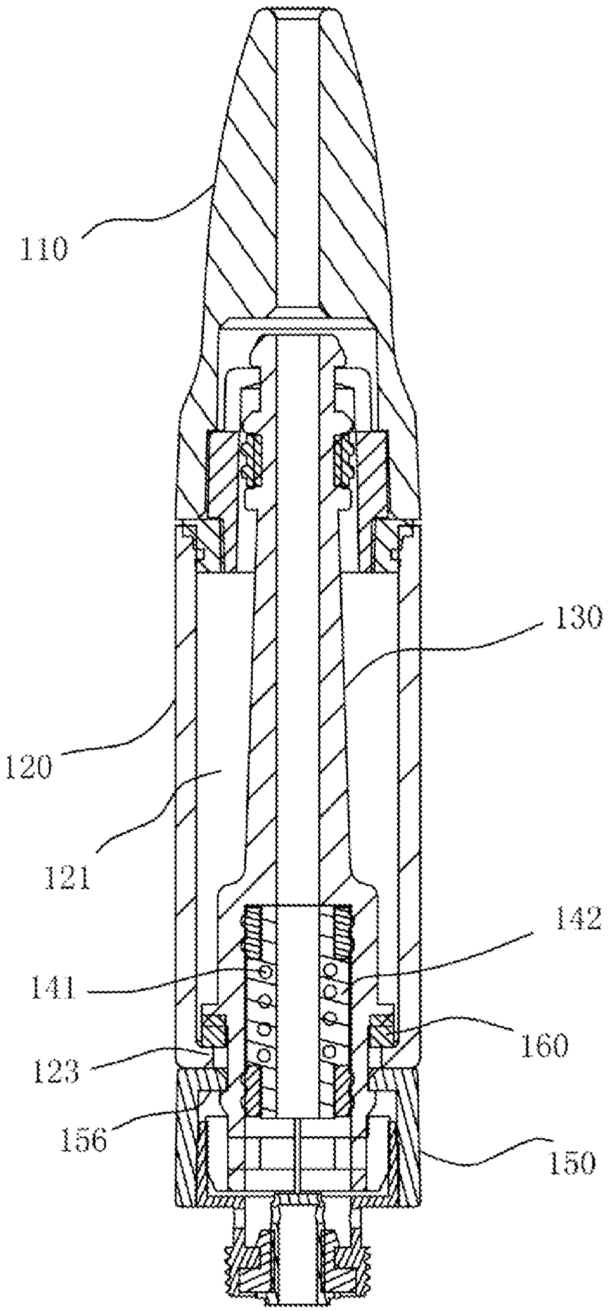
FIG. 2 is a sectional view of the atomizer in FIG. 1.
Figure 3:
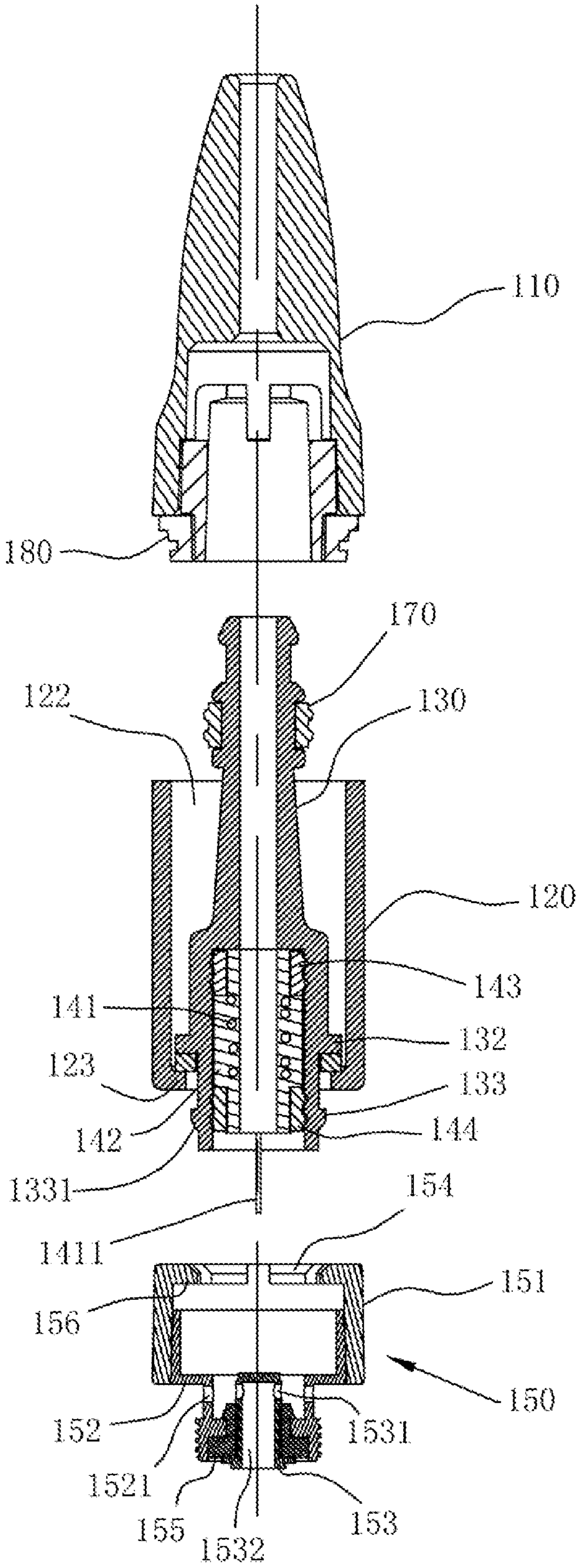
FIG. 3 is an exploded perspective view of main parts of the atomizer in FIG. 2.

As shown in FIG. 1 and FIG. 2, this embodiment discloses an atomizer 100 for an electronic cigarette, including a suction nozzle 110, an oil storage pipe 120, a ventilation pipe 130, an atomization assembly 140 and an electrical connection seat 150. The oil storage pipe 120 is made of glass material, and one part of the ventilation pipe 130 is arranged in the oil storage pipe 120. The ventilation pipe 130 and the oil storage pipe 120 together form an oil storage cavity 121 with an opening 122. The suction nozzle 110 is connected to the ventilation pipe 130, and the suction nozzle 110 seals the opening 122 after connection. The electrical connection seat 150 is used for connecting an external power supply (referring to FIG. 7). As shown in FIG. 3, the electrical connection seat 150 includes a plastic socket 151, a first electrode 152 and a second electrode 153. The socket 151 is provided with an integrally formed edgefold 154, and the first electrode 152 is fixed on the socket 151 and is located at the end away from the edgefold 154. The first electrode 152 is provided with a connection structure for connecting to an external power supply. The first electrode 152 and the second electrode 153 are connected by an insulator 155 sleeved between.

Figure 4:
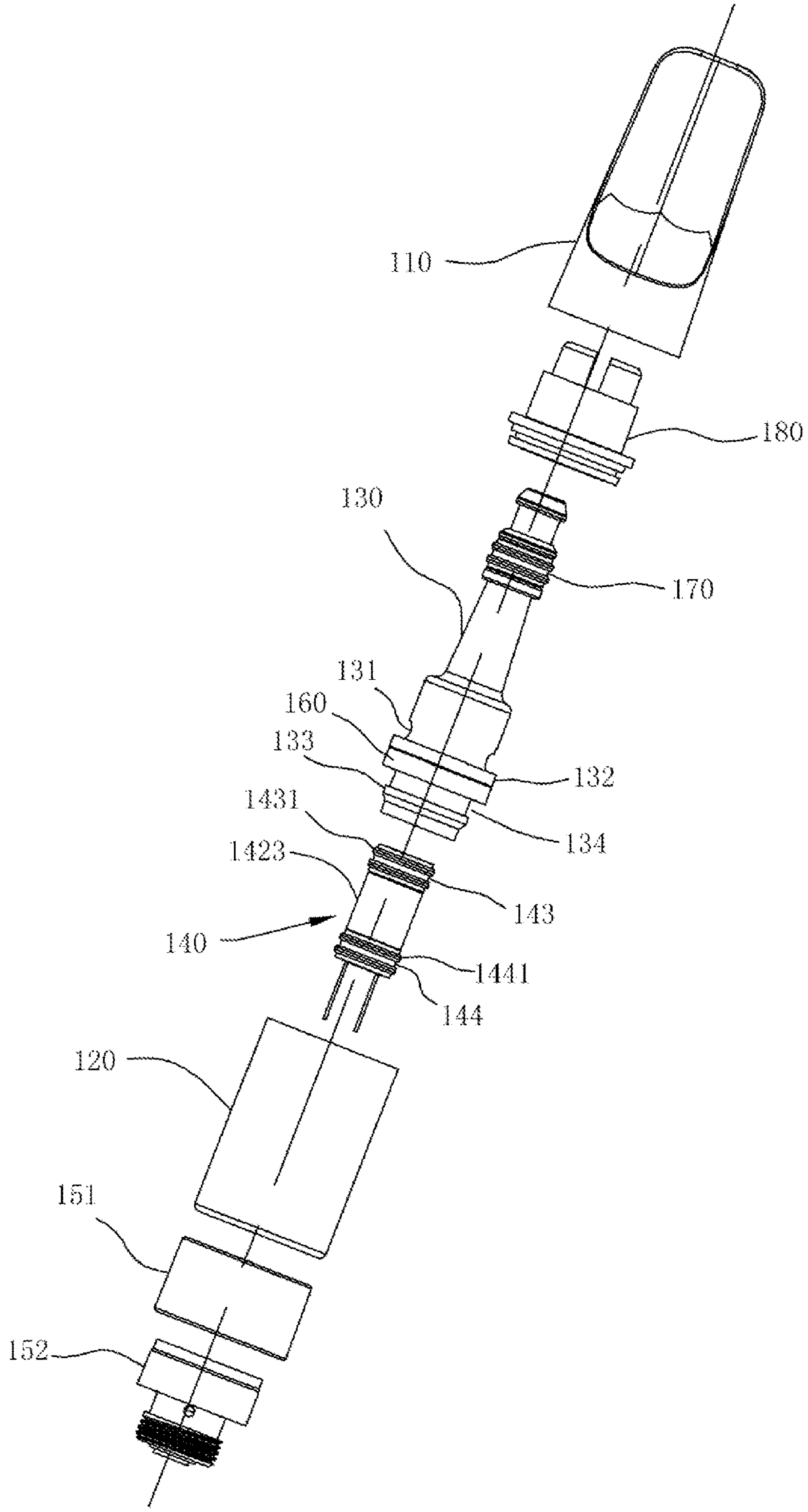
FIG. 4 is a structural exploded perspective view of the atomizer in FIG. 1.
Figure 5:
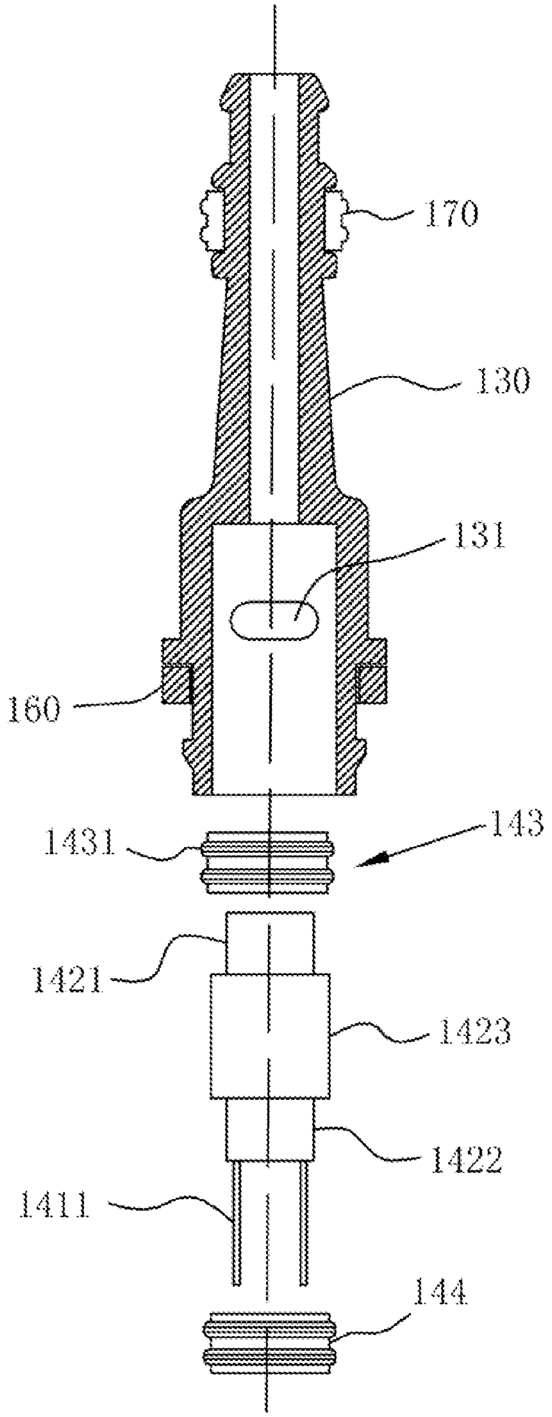
FIG. 5 is a structural exploded view of the ventilation pipe and the atomization assembly.

As shown in FIG. 3 and FIG. 4, the atomization assembly 140 includes a heating element 141 and an oil absorber 142. The heating element 141 has two electrical connection ends 1411, and the two electrical connection ends 1411 are respectively electrically connected to the first electrode 152 and the second electrode 153. In this embodiment, the oil absorber 142 is made of ceramic material, and the heating element 141 is arranged in the oil absorber 142. As shown in FIG. 3 and FIG. 4, the ventilation pipe 130 is provided with an oil inlet hole 131 that communicates with the oil storage cavity 121, and the atomization assembly 140 is arranged in the ventilation pipe 130 to absorb the fuming material (such as electronic cigarette liquid) from the oil inlet hole. Specifically, as shown in FIG. 5, the oil absorber 142 has a first end 1421 and a second end 1422. The first end 1421 is sleeved with an elastic sealing sleeve 143, and the second end 1422 is sleeved with an elastic sealing sleeve 144. The portion 1423 of the middle side surface of the oil absorber 142 that is not enclosed by the sealing sleeve 143 and the sealing sleeve 144 is close to the oil inlet hole 131 so as to absorb the e-liquid flowing in from the oil inlet hole 131. After the atomization assembly 140 is installed in the ventilation pipe 130, the sealing sleeve 143 and the sealing sleeve 144 abut against the inner wall of the ventilation pipe 130. The outer diameter of the portion of the oil absorber 142 enclosed by the sealing sleeves 143 and 144 is less than the outer diameter of the portion of the oil absorber 142 that is not enclosed by the sealing sleeves 143 and 144. In this embodiment, the outer diameter of the portion of the oil absorber 142 near the oil inlet hole 131 is close to the inner diameter of the space in which the atomization assembly 140 is arranged in the ventilation pipe 130.

As shown in FIG. 4, the sealing sleeve 143 is provided with two convex rings 1431 surrounding the sealing sleeve 143 on the surface contacting the ventilation pipe 130, and the sealing sleeve 144 is provided with two convex rings 1441 surrounding the sealing sleeve 144 on the surface contacting the ventilation pipe 130. The purpose of both the convex rings 1431 and the convex rings 1441 is to improve the assembly quality of the sealing sleeves 143 and 144 and optimize the oil leakage prevention effect of the sealing sleeve 143 and the sealing sleeve 144.

As shown in FIG. 3 and FIG. 4, the limiting stepped column 132 protrude from an outer side surface of the ventilation pipe 130 and the protrusion 133 protrude from the outer side surface of the ventilation pipe 130. The stepped column 132 and the protrusion 133 are located at one end of the ventilation pipe 130 and define a groove 134 at the outer side surface of the ventilation pipe 130. The oil storage pipe 120 is provided with a flange 123 at the end connecting the ventilation pipe 130 in the radial direction. The electrical connection seat 150 is provided with an edgefold 156 at the end connecting the ventilation pipe 130 in the radial direction. The flange 123 and the edgefold 156 are both sleeved on the outer side surface of the ventilation pipe 130 and fixed in the groove 134. Specifically, in this embodiment, the outer diameter of the stepped column 132 is greater than the inner diameter of the flange 123 and less than the inner diameter of the oil storage pipe 120, and the stepped column 132 is located in the oil storage cavity 121; the inner diameter of the flange 123 is greater than the outer diameter of the protrusion 133, so that the flange 123 abuts against the first sealing ring 160 after passing the protrusion 133. At this time, the first sealing ring 160 is deformed to seal the oil storage cavity 121. The flange 123 can pass the protrusion 133 and then abut against the first sealing ring 160, and the edgefold 156 passes the protrusion 133 through elastic deformation and then abuts against the flange 123 and the protrusion 133 respectively at two sides.

As shown in FIG. 2 and FIG. 4, both ends of the ventilation pipe 130 are respectively sleeved with a first sealing ring 160 and a second sealing ring 170, and the first sealing ring 160 is located in the groove 134 and abuts against the stepped column 132 and the flange 123. The first sealing ring 160 compresses the stepped column 132 and the flange 123 by generating deformation so as to prevent oil leakage from the connection gap between the stepped column 132 and the flange 123, and also makes the edgefold 156 press the protrusion 133, thereby allowing the flange 123 and the edgefold 156 to be fixed in the groove 134 through clamping.

Similarly, in other embodiments, in order to prevent oil leakage in the gap between the stepped column 132 and the flange 123, the first sealing ring 160 can be replaced by sealant arranged between the stepped column 132 and the flange 123 to seal the oil storage cavity 121.

As shown in FIG. 3, the side surface of the first electrode 152 is provided with an air hole 1521, the side surface of the second electrode 153 is provided with an air hole 1531, and the second electrode 152 has a blind hole 1532. In this embodiment, the air hole 1521 communicates with the outside world for air intake; the air hole 1531 communicates with the blind hole 1532 for communication with the air passage in the power supply to activate the pneumatic switch. The second electrode 153 is located right under the ventilation pipe 130, and the end surface facing the ventilation pipe 130 is a plane. The purpose of this arrangement is to prevent the e-liquid condensed in the ventilation pipe 130 from dripping directly into the air hole 1531 and into the air passage in the power supply.

Figure 6:
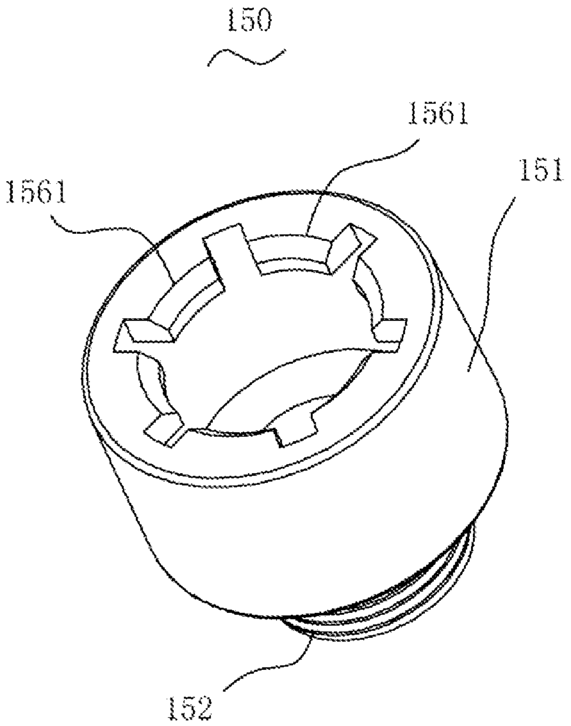
FIG. 6 is a structural perspective view of the electrical connection seat.

As shown in FIG. 6, the edgefold 156 is a claw-like structure composed of a plurality of elastic bodies 1561; the inner diameter of the edgefold 156 (the inner diameter of the defined circle) is less than the outer diameter of the protrusion 133 (this can also be set as slightly less than the outer diameter of the groove 134), the surface of the protrusion 133 in contact with the edgefold 156 is substantially perpendicular to the side surface of the ventilation pipe 130, and the surface of the edgefold 156 in contact with the protrusion 133 is substantially perpendicular to the side surface of the ventilation pipe 130. The purpose of adopting the substantially vertical arrangement is to further prevent the electrical connection seat 150 from escaping from the confine of the protrusion 133. In this embodiment, as shown in FIG. 3, during the assembly process, the surface 1331 of the protrusion 133 in contact with the edgefold 156 is first an inclined surface or an arc transitional surface. The purpose of setting the surface 1331 of the protrusion 133 contacting the edgefold 156 as an inclined surface or a circular arc transitional surface is to facilitate the edgefold 156 to smoothly pass the protrusion 133 to complete the assembly of the electrical connection seat 150.

As shown in FIG. 2 and FIG. 3, the suction nozzle 110 is clamped on the ventilation pipe 130. The suction nozzle 110 is connected to the ventilation pipe 130, and the suction nozzle 110 abuts against the oil storage pipe 120 to seal the opening 122 after connection. At this time, the second sealing ring 170 is arranged between the suction nozzle 110 and the ventilation pipe 130, and the second sealing ring 170 abuts the suction nozzle and the ventilation pipe; a third sealing ring 180 is arranged between the suction nozzle 110 and the oil storage pipe 120. The second sealing ring 170 and the third sealing ring 180 are preferably made of silicone material, and are used to seal the oil storage cavity 121.

Because the limiting stepped column 132 protrude from an outer side surface of the ventilation pipe 130 and the protrusion 133 protrude from the outer side surface of the ventilation pipe 130, the oil storage pipe 120 and the electrical connection seat 150 are sleeved on the outer side surface of the ventilation pipe 130 through the flange 123 and the edgefold 156 and are fixed in the groove 134, this fixing connection solution of sleeving and clamping is simple in assembly, low in manufacturing and assembly cost, and convenient for quality control of finished products.

The Second Embodiment

Figure 7:
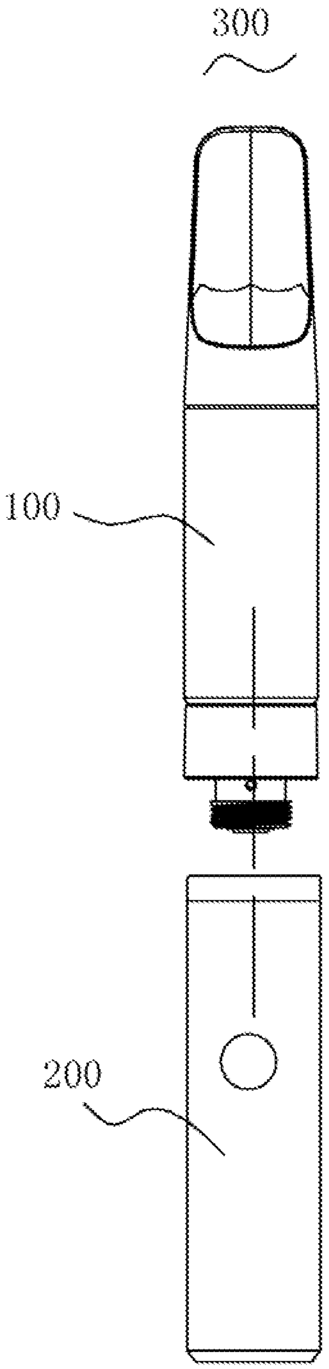
FIG. 7 is a structural elevational view of the electronic cigarette according to the second embodiment provided in the present invention.

As shown in FIG. 7, this embodiment discloses an electronic cigarette 300, including an atomizer 100 for forming smoke and a power supply 200 for supplying power to the atomizer 100. In this embodiment, the atomizer 100 and the power supply 200 are connected through threads. The atomizer 100 is the atomizer described in the first embodiment.

It will be understood that the embodiments of the present invention are only to be considered as illustrating the present disclosure instead of limiting the scope of the present disclosure. It will be apparent to those skilled in the art that, based on the disclosure and guide of the specification, modifications and variations can be made without departing from the scope and spirit disclosed by the present disclosure, and such modifications and variations all fall in the protection extent of the present disclosure. In addition, although some specific terms are used in this specification, these terms are only for the convenience of explanation and do not constitute any limitation to the present invention.

What is claimed is:

1. An atomizer for an electronic cigarette, comprising an oil storage pipe, a ventilation pipe, an atomization assembly and an electrical connection seat for connecting an external power supply, at least one part of the ventilation pipe being arranged in the oil storage pipe, and the ventilation pipe and the oil storage pipe together forming an oil storage cavity, the ventilation pipe being provided with an oil inlet hole that communicates with the oil storage cavity, and at least one part of the atomization assembly being arranged in the ventilation pipe to absorb the fuming material from the oil inlet hole, the electrical connection seat being provided with a conductive electrode, and a heating element in the atomization assembly being electrically connected to the conductive electrode;

wherein the atomizer comprises a limiting stepped column protruding from an outer surface of the ventilation pipe, and a protrusion protruding from the outer surface of the ventilation pipe, the stepped column and the protrusion are arranged at one end of the ventilation pipe and define a groove at the outer side surface of the ventilation pipe, one end of the oil storage pipe is radially provided with a flange, one end of the electrical connection seat is radially provided with an edgefold, at least one part of the flange and at least one part of the edgefold are sleeved and fixed in the groove, and the connection between the oil storage pipe and the ventilation pipe is an airtight coupling.

2. The atomizer for the electronic cigarette of claim 1, wherein the ventilation pipe is also sleeved with a first sealing ring, the first sealing ring is located in the groove and compresses the limiting stepped column and the flange, the edgefold abuts the flange and the protrusion.

3. The atomizer for the electronic cigarette of claim 1, wherein a sealant is further provided between the stepped column and the flange, the sealant is used to seal the connection gap between the stepped column and the flange; the edgefold abuts the flange and the protrusion.

4. The atomizer for the electronic cigarette of claim 1, wherein the stepped column is located in the oil storage cavity, the flange abuts the stepped column after passing the protrusion, the edgefold goes through the protrusion by elastic deformation and then abuts the flange and the protrusion.

5. The atomizer for the electronic cigarette of claim 4, wherein the edgefold is a claw-like structure composed of a plurality of elastic bodies; the inner diameter defined by the edgefold is less than the outer diameter of the protrusion or the groove; the surface of the protrusion contacting the edgefold is substantially perpendicular to the side surface of the ventilation pipe, the surface of the edgefold contacting the protrusion is substantially perpendicular to the side surface of the ventilation pipe.

6. The atomizer for the electronic cigarette of claim 4, wherein during the assembly process, the surface that the protrusion and the edgefold contact first is an inclined surface or an arc transitional surface.

7. The atomizer for the electronic cigarette of claim 1, further comprising a suction nozzle, the oil storage cavity enclosed by the ventilation pipe and the oil storage pipe has an opening, after the suction nozzle is connected to the ventilation pipe or/and the oil storage pipe, the opening is sealed.

8. The atomizer for the electronic cigarette of claim 7, wherein the suction nozzle is connected to the ventilation pipe through a clamping structure, after the suction nozzle is connected to the ventilation pipe, the suction nozzle abuts against the oil storage pipe to seal the opening.

9. The atomizer for the electronic cigarette of claim 8, further comprising a second sealing ring and a third sealing ring, the second sealing ring is located between the suction nozzle and the ventilation pipe, the second sealing ring tightly presses the suction nozzle and the ventilation pipe; the third sealing ring tightly presses the suction nozzle and the oil storage pipe.

10. The atomizer for the electronic cigarette of claim 1, wherein the atomization assembly has an oil absorber, the atomization assembly has two ends, both ends of the atomization assembly are sleeved with elastic sealing sleeves, the part of the middle side surface of the atomization assembly that is not covered by the sealing sleeve is close to the oil inlet hole so as to absorb the e-liquid flowing in from the oil inlet hole; after the atomization assembly is installed in the ventilation pipe, both the sealing sleeves abut against the inner wall of the ventilation pipe.

11. The atomizer for the electronic cigarette of claim 10, wherein each of the sealing sleeves is provided with at least one convex ring surrounding the sealing sleeve on the surface contacting the ventilation pipe.

12. The atomizer for the electronic cigarette of claim 10, wherein the outer diameter of the portion of the oil absorber covered by the sealing sleeve is less than the outer diameter of the portion of the oil absorber that is not covered by the sealing sleeve.

13. The atomizer for the electronic cigarette of claim 10, wherein the outer diameter of the part of the oil absorber by the oil inlet hole is close to the inner diameter of the space in which the atomization assembly is arranged in the ventilation pipe.

14. The atomizer for the electronic cigarette of claim 1, wherein the electrical connection seat comprises a plastic socket, a first electrode and a second electrode, and the edgefold is integrally formed on the socket, the first electrode is fixed on the socket and is located at one end away from the edgefold, and the first electrode and the second electrode are connected by an insulator sleeved between.

15. An electronic cigarette comprising an atomizer and a power supply, the power supply is used to supply power for the atomizer, wherein the atomizer is the atomizer of claim 1.

* * * * *